Jan. 11, 1938.                M. V. CLARK                2,105,213
                              SLIDE FASTENER
                            Filed Oct. 1, 1934
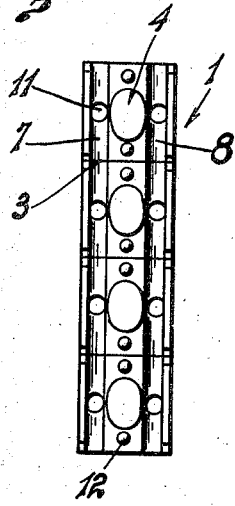
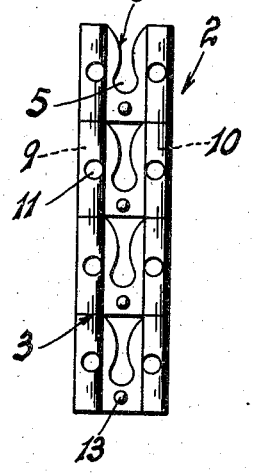
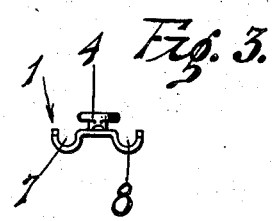
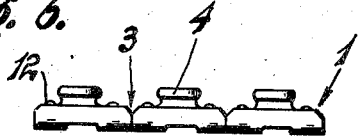
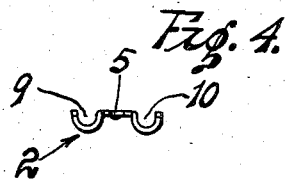
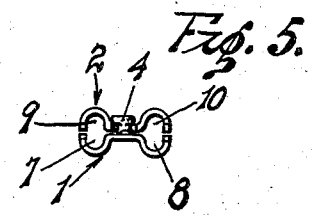
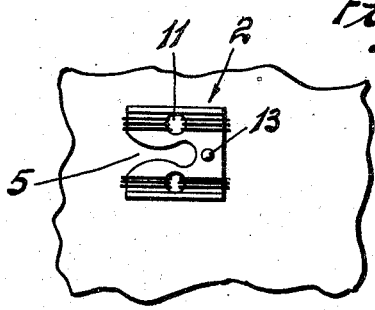
INVENTOR.
MABEL V. CLARK.
BY
ATTORNEY.

Patented Jan. 11, 1938

2,105,213

UNITED STATES PATENT OFFICE 2,105,213

SLIDE FASTENER

Mabel V. Clark, Los Angeles, Calif.

Application October 1, 1934, Serial No. 746,287

7 Claims. (Cl. 24—223)

This invention relates to a fastener of the detachable type, by means of which parts of clothing, and the like, are secured together.

An object of my invention is to provide a novel method of manufacturing the parts of the fastener in a continuous strip. The fasteners are sold in a strip, being separated by the user.

Another object is to provide a fastener which has recesses at the sides thereof in which the thread lies, thereby effectively protecting the thread against excessive wear.

A further object is to provide a fastener of the character stated, in which the two parts slide into and out of engagement, one-half of the fastener being held in a groove in the other half, the groove having a constricted neck which yieldably presses against the head on the complementary member.

Still another object is to provide a fastener which is simple in construction, inexpensive to manufacture and effective in use.

Other objects, advantages and features of invention may appear from the accompanying drawing, the subjoined detailed description, and the appended claims.

In the drawing:

Figure 1 is a top plan view of a strip of fasteners.

Figure 2 is a bottom plan view of the fasteners which co-act with those shown in Fig. 1.

Figure 3 is an end view of one of the fasteners.

Figure 4 is an end view of a fastener complementary to that shown in Fig. 3.

Figure 5 is an end view of the fastener parts secured together.

Figure 6 is a side elevation of the fastener shown in Fig. 1.

Figure 7 is a side elevation of the fastener shown in Fig. 2.

Figure 8 is a plan view of one part of the fastener stitched on a cloth.

Referring more particularly to the drawing, my fasteners include a pair of complementary members, 1—2. These fasteners are manufactured from a metal of suitable thickness, and are stamped out of a continuous strip of the metal. The parts 1—2 are not cut off the strip of metal as they are manufactured but are joined together along the abutting edges thereof.

As a fastener part is formed by the die, a cut 3 is made partly thru the metal but sufficient metal remains that the fasteners will hold together in a continuous line. The cut 3 is deep enough that by bending the fastener downwardly, it will break along the line 3 and can then be stitched to the article, as desired.

The fastener part 1 includes a head 4 at the center thereof which co-acts with a slot 5 in the part 2. The slot 5 has a constricted portion 6 which snaps around the head 4, thus holding the part 1 in engagement with the part 2.

A pair of grooves 7—8 are provided—one groove at each side of the fastener 1. Similarly, the fastener 2 is provided with grooves 9—10 at the sides thereof.

A hole 11 is provided in each of the fasteners' this hole being positioned within the grooves 7—8 and 9—10. The purpose of this hole is to enable the thread to encircle the fastener between the hole and each end of said fastener, thereby positioning the thread entirely within the groove. By this arrangement, the thread is not contacted by the complementary fastener member as the fastener is opened and closed, and therefore, excessive strain or wear on the thread is eliminated. This stitching arrangement is shown in Fig. 8. The half of the fastener having the slot therein is so arranged that the base of this slot is positioned on the cut 3. Thus, when the fasteners are broken from the continuous strip, the end of the slot will be open so that the head 4 can be inserted.

To prevent unfastening of the fastener when the complementary parts are set together, acting together with the constricted neck portion 6, I provide an upwardly punched lug 12 on the one member and a depressed recess 13 in the other. The lug 12 fits into the recess 13 when the two parts are fitted together, thus preventing the accidental displacement of the two parts of the fastener.

When my fastener is made from a continuous strip of material, as shown in Figs. 1-7, inclusive, I find that—due to the rectangular shape of the individual fastener—there is no waste material. Consequently, my fastener is very inexpensive to manufacture. The square ends of the fastener enable the members to be cut from the strip by a straight incision, thus materially reducing waste.

The strip of material from which the fasteners are made is of just sufficient width that the completed fastener contains all of the material of the strip without any trimming off of the edges of the strip.

Having described my invention, I claim:

1. In a slide fastener, including a body, said body having a longitudinal groove adjacent each side thereof extending the entire length of the body and open at both ends, said groove being adapted and arranged to receive a mounting thread.

2. In a slide fastener, including a body, said body having a longitudinal groove adjacent each side thereof extending the entire length of the body and open at both ends, said groove being adapted and arranged to receive a mounting thread, said body having a hole extending therethru, said hole being positioned in a groove.

3. A slide fastener comprising a pair of complementary members, one of said members having a head formed thereon, the other member having a slot formed therein, a constricted neck in the slot, said head being adapted and arranged to slide past the neck whereby the members are releasably held together, each of said members having longitudinally extending grooves adjacent the sides thereof adapted to receive a mounting thread, said grooves extending the entire length of the members and open at both ends.

4. A slide fastener comprising a pair of complementary members, one of said members having a head formed thereon, the other member having a slot formed therein, a constricted neck in the slot, said head being adapted and arranged to slide past the neck whereby the members are releasably held together, each of said members having longitudinally extending grooves adjacent the sides thereof adapted to receive a mounting thread, and each of said members having a hole in each of the grooves therein, said grooves extending the entire length of the members and open at both ends.

5. A slide fastener comprising a pair of complementary members, one of said members having a head formed thereon, the other member having a slot formed therein, a constricted neck in the slot, said head being adapted and arranged to slide past the neck whereby the members are releasably held together, one of said members having a depression therein and the other member having an upstanding lug thereon, said lug entering the depression to assist in holding said members together, each of said members having longitudinally extending grooves on each side thereof, said grooves extending the entire length of each member.

6. A slide fastener comprising a pair of complementary members, one of said members having a head formed thereon, the other member having a slot formed therein, a constricted neck in the slot, said head being adapted and arranged to slide past the neck whereby the members are releasably held together, one of said members having a depression therein and the other member having an upstanding lug thereon, said lug entering the depression to assist in holding said members together, one of said members having a longitudinal groove adjacent each side thereof, said groove being adapted and arranged to receive the fastening thread.

7. A fastener comprising a body, engaging means on said body, said body having grooves formed at the edges thereof, and said grooves extending the entire length of the body and being open at both ends, said grooves being adapted to retain the fastening means, said grooves being below the plane of the body of the fastener.

MABEL V. CLARK.